R. T. SMITH.
Improvement in Transmitting Motive Power.
No. 4,623. *Fig. 1* Reissued Nov. 7, 1871.
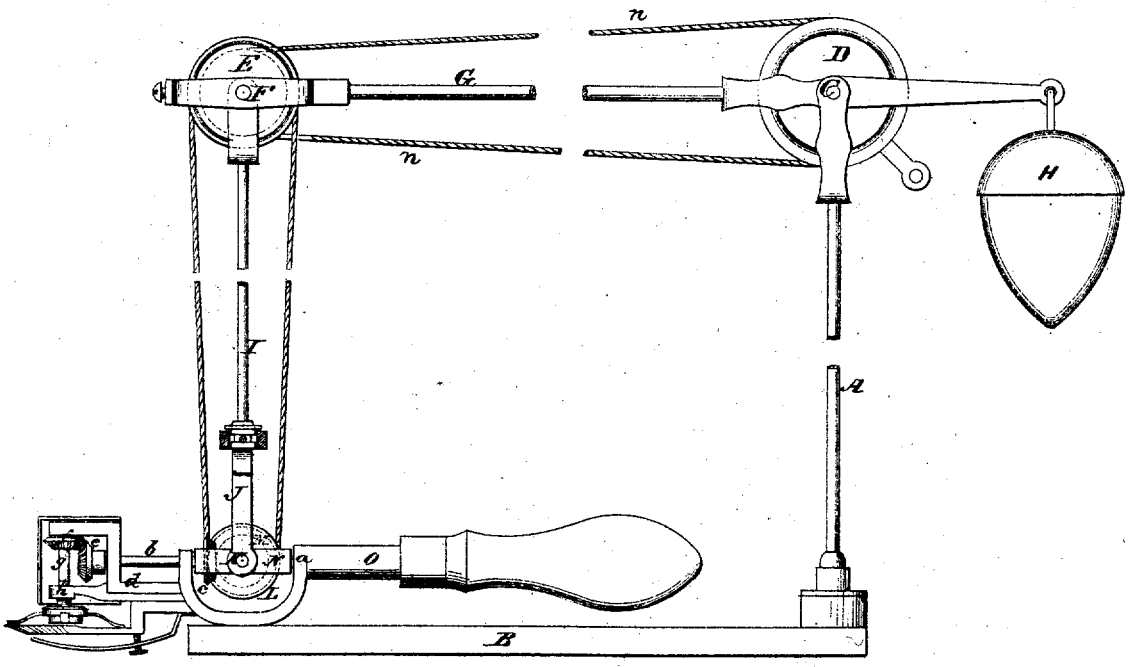
*Fig. 2.*
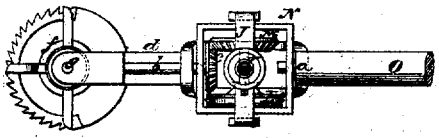
*Witnesses.*
R. T. Campbell.
J. N. Campbell.
*Inventor.*
R. T. Smith
by
Mason, Fenwick & Lawrence.
AM. PHOTO-LITHOGRAPHIC CO. N.Y. (OSBORNE'S PROCESS.)

UNITED STATES PATENT OFFICE.

ROSWELL T. SMITH, OF NASHUA, NEW HAMPSHIRE, ASSIGNOR TO HIMSELF, JOHN G. BLUNT, WILLIAM EARL, AND J. K. PRIEST, OF SAME PLACE.

IMPROVEMENT IN TRANSMITTING MOTIVE POWER.

Specification forming part of Letters Patent No. 59,089, dated October 23, 1866; reissue No. 4,623, dated November 7, 1871.

*To all whom it may concern:*

Be it known that I, ROSWELL T. SMITH, of Nashua, in the county of Hillsborough and State of New Hampshire, have invented a new and useful Improvement in Transmitting Motive Power; and I do hereby declare that the following is a full, clear, and exact description thereof, reference being had to the accompanying drawing making part of this specification, in which—

Figure 1 is an elevation of one side of the machine, partly in section. Fig. 2 is a top view of part of the machine.

Similar letters of reference indicate corresponding parts in both figures.

My invention is designed to afford a convenient means of transmitting motion from a suitable prime mover to a shearing instrument, brush, or other instrument which it is required to hold in the hand and allow free universal motion.

The following description will enable others skilled in the art to understand my invention:

In the accompanying drawing, A represents a standard which rises from a bed, B, and the upper end of which forms the bearing for a shaft, C, to which a rotary motion is imparted by a hand-crank or any other suitable power. On the shaft C is mounted a pulley, D, from which rotary motion is transmitted, by a belt, *n*, and pulley E, to a shaft, F, which has its bearings in the bifurcated end of a rod or lever, G. This rod or lever G swings freely on the shaft C as a fulcrum or center, so that the pulley E can be carried all around the pulley D without disturbing the belt stretched over said pulleys; and said rod or lever extends beyond the shaft C and receives a balance-weight, H, as shown in the drawing, Fig. 1. From the shaft F is suspended a rod, I, the lower end of which is connected to a stirrup, J, so that said stirrup is free to swivel on said rod, being retained by a set-screw which engages in an annular groove in the bottom end of the rod, as shown in Fig. 1; or the connection may be effected by other suitable means. The stirrup J forms the bearings for a shaft, K, on which is applied a pulley, L, and a bevel-wheel, M, and which also supports a cage, N, that is situated between the arms of the stirrup J, as is more clearly shown in Fig. 2. From one end of the cage N extends a pin, *a*, and from the other end a shaft, *b*, which serves to support the handle O, the end of which is so shaped that it straddles the cage N, as shown in Fig. 1. On one end of the shaft *b* is applied a bevel-wheel, *c*, which gears in the bevel-wheel M, and its other end has its bearing in a Z-shaped arm, *d*, which extends from the end of handle O. On this end of the shaft *b* is secured a bevel-wheel, *e*, which gears with another bevel-wheel, *f*, on a shaft, *g*, which has its bearings at one end in the Z-shaped arm *d*, and at the other end in a bracket, *h*, secured to said arm. This shaft *g* bears cutters, a brush, or any other device to which motion is to be imparted.

It must be remarked that the handle O, instead of being made to extend in a direction opposite to the Z-shaped arm *d*, might be connected to said arm, and the motion might be transmitted from the shaft K to the shaft *g* by pulleys and belts, or any other suitable means instead of those shown in the drawing. By this arrangement the handle O can be freely moved about in any direction required. It can be turned, raised, or lowered, or moved forward or backward, without in any manner interrupting its connection with the motive power, and a device is obtained which can be used with great advantage for giving motion to a brush in currying horses, or to a cutter, a shearing-machine, or other parts of a machine of a similar nature.

The standard A is made to swivel in its socket—that is to say, it is allowed to turn horizontally—or, if desired, it may be made of two parts connected by a swivel-joint.

One very important feature of my invention is the combination, with the jointed rods and pulleys, of a weight, H. This weight, on the shortest arm of the lever G, is designed to balance the weight of the longest arm and the parts depending therefrom, so as to relieve the operator of the instrument from the weight which he would otherwise have to support in his hand.

Having described my invention, what I claim as new, and desire to secure by Letters Patent, is—

1. The swinging rod or lever G and its counterbalancing weight in a machine for transmitting motion, substantially as described.

2. The combination of the loaded lever G and swivel-standard A in a machine for transmitting motion, substantially as described.

3. The jointed arm I, in combination with the loaded lever G and turning or swivel-standard A in a machine for transmitting motion, substantially as described.

4. The combination, with the pendent swinging arm I, of the stirrup J, pivot-shaft K, and handle O, substantially as described.

5. The belt-pulley E on pivot-shaft C, and the belt-pulley L on pivot-shaft K, in combination with lever G and arm I, substantially as described.

6. The swivel-stirrup J on swinging arm I, in combination with cage N, handle O, and shaft *g*, and connecting with the shaft K in the stirrups by bevel-gear or other equivalent means, substantially as described.

ROSWELL T. SMITH.

Witnesses:
E. P. EMERSON,
WM. EARL, Jr.

(67)